(12) United States Patent
Abhishek et al.

(10) Patent No.: US 11,943,073 B2
(45) Date of Patent: Mar. 26, 2024

(54) MULTIPLE GROUPING FOR IMMERSIVE TELECONFERENCING AND TELEPRESENCE

(71) Applicant: Tencent America LLC, Palo Alto, CA (US)

(72) Inventors: Rohit Abhishek, Kansas City, MO (US); Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/741,351

(22) Filed: May 10, 2022

(65) Prior Publication Data

US 2022/0368550 A1 Nov. 17, 2022

Related U.S. Application Data

(60) Provisional application No. 63/187,346, filed on May 11, 2021.

(51) Int. Cl.
*H04L 12/18* (2006.01)
*H04L 65/1104* (2022.01)

(52) U.S. Cl.
CPC ...... *H04L 12/1822* (2013.01); *H04L 12/1827* (2013.01); *H04L 65/1104* (2022.05)

(58) Field of Classification Search
None
See application file for complete search history.

(56) References Cited

U.S. PATENT DOCUMENTS 9,467,657 B2 10/2016 Decker et al.
10,063,643 B2 * 8/2018 Martin De Nicolas ..................... H04L 65/1104

(Continued)

FOREIGN PATENT DOCUMENTS

KR 20180097017 A 8/2018
WO 2020264088 A1 12/2020

(Continued)

OTHER PUBLICATIONS

3GPP—TSG—SA4 Meeting 112—ITT4RT Permanent Document—Requirement, Working Assumptions and Potential Solutions—Version 0.10.1—Feb. 1-10, 2021 (Year: 2021).*

(Continued)

*Primary Examiner* — Younes Naji
(74) *Attorney, Agent, or Firm* — ARENTFOX SCHIFF LLP

(57) ABSTRACT

Aspects of the disclosure provide methods and apparatuses for video conference and/or telepresence. In some examples, video conference/telepresence can be performed by multiple client devices, user devices and a media control device (e.g., server device). For example, a first client device determines a grouping control that limits a grouping of an overlay media from a second client device with an immersive media of the first client device, and transmits a grouping control signal indicative of the grouping control to inform a media control device. Further, the first client device provides one or more media including the immersive media to the media control device. The media control device can group a plurality of immersive media streams in a single or multiple groups based on the grouping control signal received from the first client device.

20 Claims, 9 Drawing Sheets

(56) References Cited

U.S. PATENT DOCUMENTS

| | | | |
|---|---|---|---|
| 11,102,549 B2* | 8/2021 | Gutman | H04N 21/47205 |
| 2010/0014825 A1* | 1/2010 | Curtis | G11B 27/10 |
| | | | 386/200 |
| 2014/0281014 A1* | 9/2014 | Good | H04N 21/845 |
| | | | 709/231 |
| 2019/0069007 A1* | 2/2019 | Bodas | H04N 19/44 |
| 2021/0201855 A1* | 7/2021 | Kammachi-Sreedhar | |
| | | | H04N 13/183 |
| 2022/0239719 A1* | 7/2022 | Gül | H04N 21/6587 |
| 2022/0321926 A1* | 10/2022 | Yip | H04L 65/1016 |
| 2023/0119757 A1* | 4/2023 | Mate | H04L 65/61 |
| | | | 348/14.07 |

FOREIGN PATENT DOCUMENTS

| | | | | |
|---|---|---|---|---|
| WO | WO-2020264088 A1 * | 12/2020 | | H04L 65/1006 |
| WO | WO-2021214379 A1 * | 10/2021 | | H04L 65/00 |

OTHER PUBLICATIONS

Camarillo, G., and H. Schulzrinne. The session description protocol (SDP) grouping framework. RFC 5888, Jun. 2010.

Information Technology—Coded Representation of Immersive Media—PART 2: Omnidirectional Media Format, ISO/IEC DIS 23090-2, 2020 Edition, Jun. 16, 2020.

ITT4RT Permanent Document—Requirements, Working Assumptions and Potential Solutions, Intel, Nokia Corporation (ITT4RT Co-Rapporteurs), 3GPP TSG-SA4, S4-200840, Meeting #109e, Online Meeting, May 20-Jun. 3, 2020.

International Search Report dated Aug. 3, 2022 in Application No. PCT/US2022/072246, 16 pages.

Extended European Search Report in EP22789150.4, dated Sep. 21, 2023, 10 pages.

Nokia Corporation (ITT4RT Rapporteur), "ITT4RT Permanent Document—Requirements, Working Assumptions and Potential Solutions," 3GPP TSG SA WG4 Meeting #113e, Apr. 6-14, 2021, S4-210540, Online Meeting, 85 pages.

* cited by examiner a= itt4rt_group:<mid-360A>; < mid-OB1>; < mid-OC2>
a= itt4rt_group:<mid-360B>; < mid-OA1>;< mid-OC2>
a= itt4rt_group:<mid-360C>; < mid-OA1>;< mid-OB2>

FIG. 4A a= itt4rt_group:<mid-360A>; < mid-OB1>
a= itt4rt_group:<mid-360B>; < mid-OA1>
a= itt4rt_group:<mid-360C>; < mid-OA1>;< mid-OB2>

FIG. 4B a= itt4rt_group:<mid-360A> < mid-OA1>; < mid-OB1>;< mid-OC1>

FIG. 4C a= itt4rt_group:<mid-360A>; <mid-360B>; < mid-OC1> < mid-OC2>

FIG. 4D a= itt4rt_group:<mid-360A>; <mid-360B>; <mid-360C> <mid-OC1> < mid-OC2>

FIG. 4E a= itt4rt_group:<mid-360A> <mid-OA1> <mid-OA2>
a= itt4rt_group:<mid-360B>; <mid-OA1>;<mid-OC2>
a= itt4rt_group:<mid-360C>; <mid-OA1>;<mid-OB2>

FIG. 5A a= itt4rt_group:<mid-360A> <mid-OA1>
a= itt4rt_group:<mid-360B>; <mid-OA2>
a= itt4rt_group:<mid-360C>; <mid-OA1>;<mid-OB2>

FIG. 5B a= itt4rt_group:<mid-360A> <mid-OA1> <mid-OA2>
a= itt4rt_group:<mid-360B> <mid-OA1>; <mid-OB1>;< mid-OC1>

FIG. 5C a= itt4rt_group:<mid-360A> <mid-OA1> <mid-OA2>
a= itt4rt_group:<mid-360B>; <mid-360C>; <mid-OB1> <mid-OC2>

FIG. 5D

FIG. 6A a= itt4rt_group:<mid-360A>; <mid-OA1>; <mid-OB1>
a= itt4rt_group:<mid-360B>; <mid-OA2>;<mid-OC1>
a= itt4rt_group:<mid-360C>; <mid-OB2>;<mid-OC2>

FIG. 6B a= itt4rt_group:<mid-360A>; <mid-OB1>
a= itt4rt_group:<mid-360B>; <mid-OA2>
a= itt4rt_group:<mid-360C>; <mid-OB2>;< mid-OC2>

FIG. 6C a= itt4rt_group:<mid-360A> <mid-OA1>; <mid-OB1>

FIG. 6D a= itt4rt_group:<mid-360B> <mid-OB1> <mid-OB2>; <mid-OA2>; < mid-OC1>

FIG. 6E a= itt4rt_group:<mid-360C> <mid-OC1> <mid-OC2>; <mid-OB2>

MULTIPLE GROUPING FOR IMMERSIVE TELECONFERENCING AND TELEPRESENCE

INCORPORATION BY REFERENCE

This present disclosure claims the benefit of priority to U.S. Provisional Application No. 63/187,346, "Multiple Grouping of 360 Video for Immersive Teleconferencing and Telepresence for Remote Terminals" filed on May 11, 2021, which is incorporated by reference herein in its entirety.

TECHNICAL FIELD

The present disclosure describes embodiments generally related to video conference and telepresence.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video conference systems allow users, at two or more remote locations, to communicate interactively with each other via media streams, such as video streams, audio streams, or both. Some video conference systems also allow users to exchange digital documents, such as images, text, video, applications, and the like.

SUMMARY

Aspects of the disclosure provide methods and apparatuses for video conference and/or telepresence. In some examples, video conference/telepresence can be performed by multiple client devices, user devices and a media control device (e.g., server device). For example, a first client device determines a grouping control that limits a grouping of an overlay media from a second client device with an immersive media of the first client device, and transmits a grouping control signal indicative of the grouping control to inform a media control device. Further, the first client device provides one or more media including the immersive media to the media control device. The media control device can group a plurality of immersive media streams in a single or multiple groups based on the grouping control signal received from the first client device.

In some examples, the immersive media includes at least one of an omnidirectional video, a 360 degree video, and a wide angle video.

In some examples, the first client device transmits a session description protocol (SDP) message with an attribute field indicative of the grouping control. In an example, the first client device transmits the SDP message with the attribute field indicative of a disallowance of a grouping of the overlay media from the second client device with the immersive media of the first client device. For example, the attribute field is in a form of "a=no_other_overlays".

In another example, the first client device transmits the SDP message with the attribute field indicative of an allowance of a grouping of the overlay media from the second client device with the immersive media of the first client device. For example, the attribute field is in a form of "a=other_overlays".

In another example, the first client device transmits the SDP message with the attribute field indicative of a media type that is allowed to be grouped with the immersive media of the first client device. For example, the attribute field is in a form of "a=allowed_content". In some examples, the media type includes at least one of a two-directional video, an image, and slides.

In some examples, the first client device transmits the SDP message with a first attribute field indicative of an allowance of a grouping of the overlay media from the second client device with the immersive media of the first client device, and a second attribute field indicative of an allowed media type.

Aspects of the disclosure also provide a non-transitory computer-readable medium storing instructions which when executed by a computer for video conference cause the computer to perform the method for video conference/telepresence.

BRIEF DESCRIPTION OF THE DRAWINGS

Further features, the nature, and various advantages of the disclosed subject matter will be more apparent from the following detailed description and the accompanying drawings in which:

FIGS. 4A-4E show some examples of attribute field(s) corresponding to the one or more media groups.

FIGS. 5A-5D show some examples of attribute field(s) corresponding to the one or more media groups.

FIGS. 6A-6E show some examples of attribute field(s) corresponding to the one or more media groups.

DETAILED DESCRIPTION OF EMBODIMENTS

Aspects of the present disclosure provide techniques for signaling of multiple grouping of an immersive video with overlays for teleconferencing and/or telepresence.

In some examples, a teleconference can be a video conference, and the participants in the video conference can communicate via media streams that can include video and audio. Telepresence is a type of video conferencing technology that provides a higher level of audio and video quality to resemble face-to-face interactions as much as possible. In the descriptions of the disclosure, video conference is used to include teleconference and telepresence, and techniques disclosed in the present disclosure can be used in teleconference and telepresence.

Figure 1:
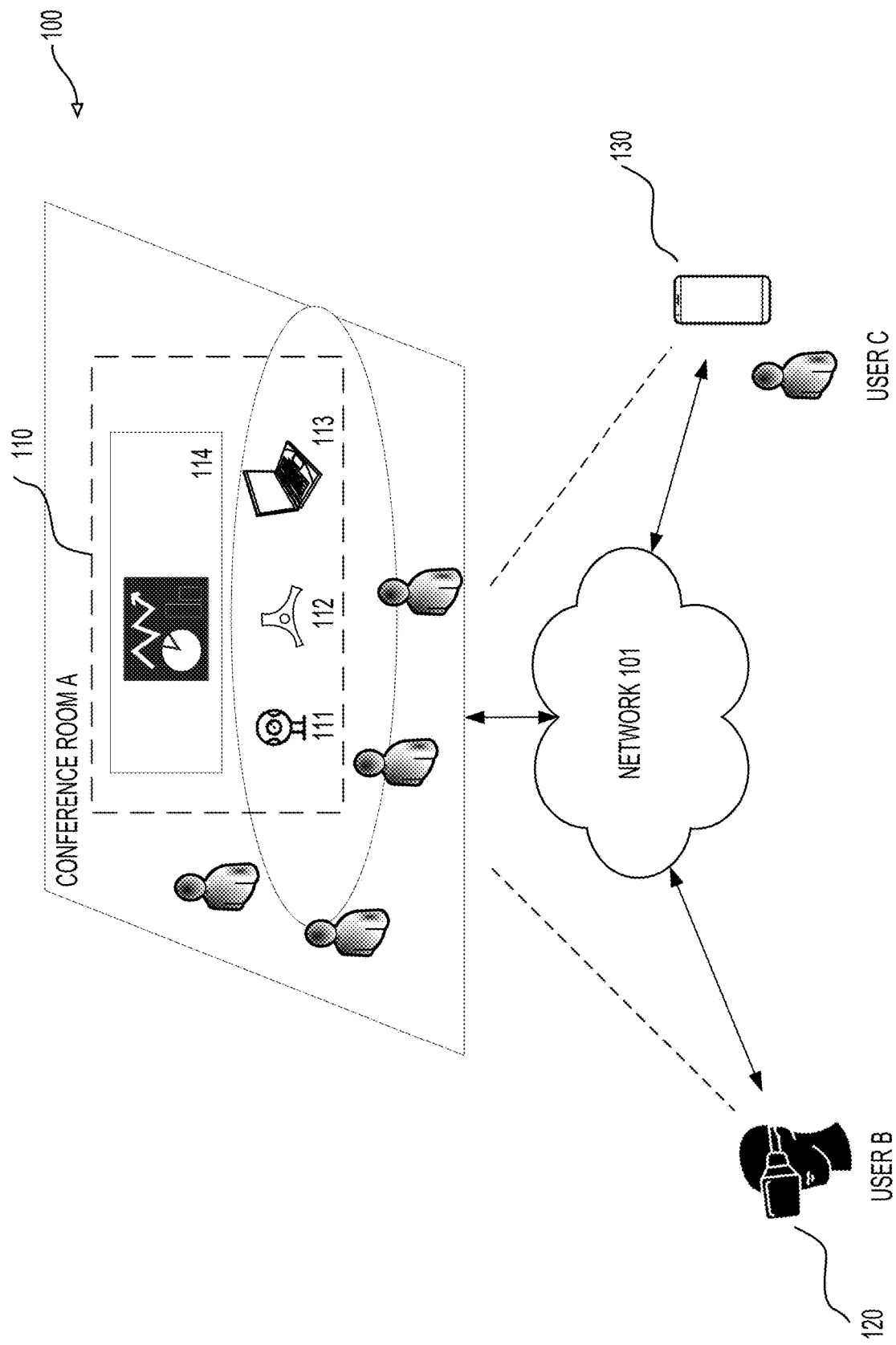
FIG. 1 shows a video conference system according to some examples of the disclosure.
Figure 2:
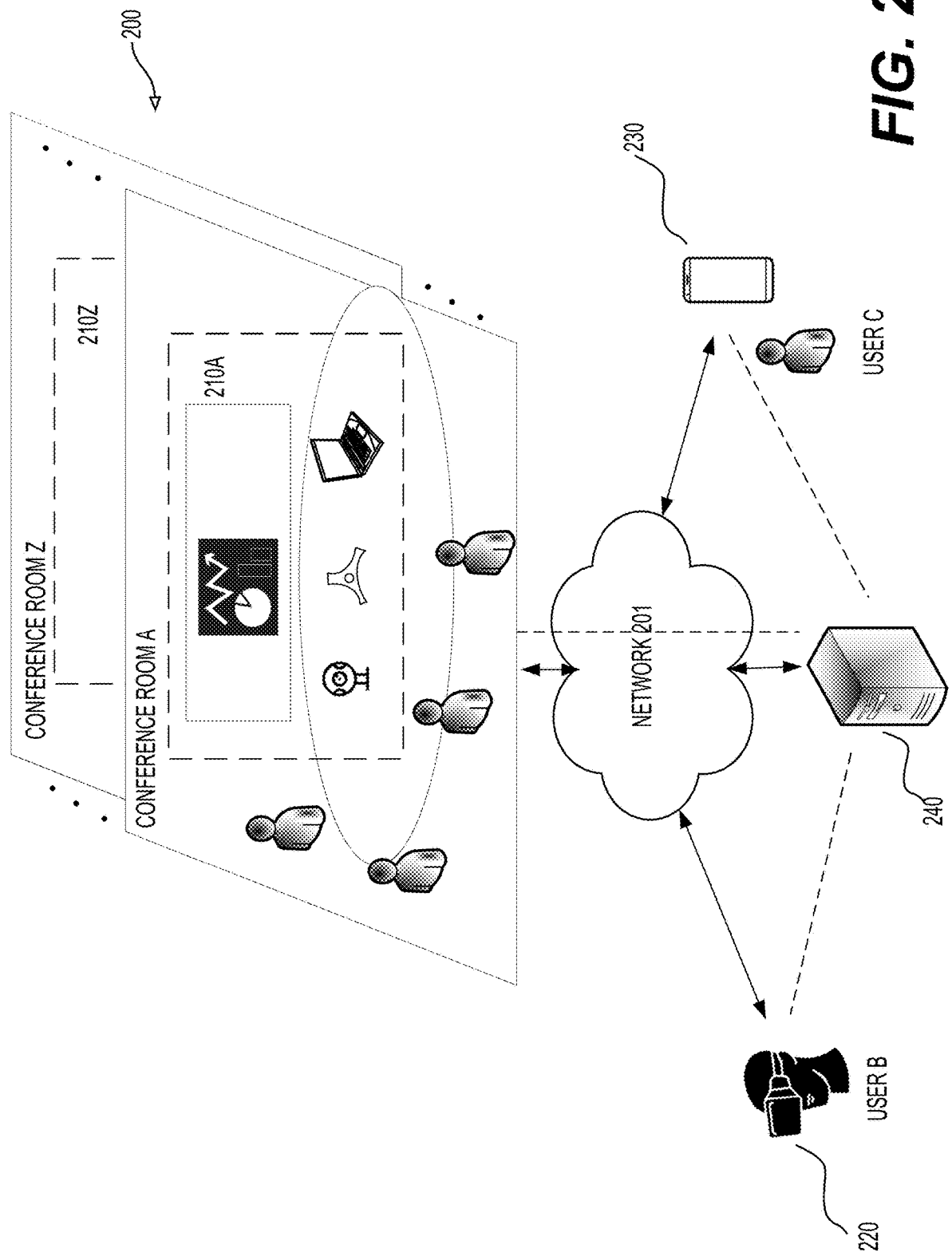
FIG. 2 shows another video conference system according to some examples of the disclosure.

FIG. 1 and FIG. 2 show some video conference systems in some examples.

FIG. 1 shows a video conference system (100). The video conference system (100) includes a sub system (110) and a plurality of user devices, such as user devices (120) and (130). The sub system (110) is installed at a location, such as conference room A. Generally, the sub system (110) is configured to have a relatively higher bandwidth than the user devices (120) and (130) and can provide a host service of a video conference session (also referred to as a video conference call). The sub system (110) can enable users or participants in the conference room A to participate in the video conference session, and can enable some remote users, such as user B of the user device (120) and user C of the user device (130) to participate in the video conference session from remote locations. In some examples, the sub system (110) and the user devices (120) and (130) are referred to as terminals in the video conference session.

In some embodiments, the sub system (110) includes various audio, video and control components that are suitable for a conference room. The various audio, video and control components can be integrated into a device, or can be distributed components that are coupled together via suitable communication technologies. In some examples, the sub system (110) includes wide-angle camera (111), such as a fisheye camera, an omnidirectional camera and the like that has a relatively wide field of view. For example, an omnidirectional camera can be configured to have a field of view that covers approximately an entire sphere, and a video taken by the omnidirectional camera can be referred to as omnidirectional video or 360-degree video.

Further, in some examples, the sub system (110) includes a microphone (112), such as an omnidirectional (also referred to as no directional) microphone that can capture sound waves from approximately any direction. The sub system (110) can include a display screen (114), a speaker device, and the like to enable users in the conference room A to play multimedia corresponding to video and audio of users at locations other than the conference room A. In an example, the speaker device can be integrated with the microphone (112) or can be a separate component (not shown).

In some examples, the sub system (110) includes a controller (113). While a laptop computing device is shown in FIG. 1 as the controller (113), other suitable device, such as desktop computer, a tablet computer, and the like can be used as the controller (113). It is also noted, in an example, the controller (113) can be integrated together with other component in the sub system (110).

The controller (113) can be configured to perform various control functions of the sub system (110). For example, the controller (113) can be used to initiate a video conference session, and manage communications between the sub system (110) and the user devices (120) and (130). In an example, the controller (113) can encode video and/or audio captured at the conference room A (e.g., captured by the camera (111) and the microphone (112)) to generate a media stream to carry the video and/or audio, and can cause the media stream to be transmitted to the user devices (120) and (130).

Further, in some examples, the controller (113) can receive, from each of the user devices in the video conference system (100) (e.g., user devices (120) and (130)), media streams that carry audio and/or video captured at the respective user devices. The controller (113) can address and transmit received media streams to the other user devices in the video conference system (100). For example, the controller (113) can receive a media stream from the user device (120), address and transmit the media stream to the user device (130), and can receive another media stream from the user device (130), address and transmit the other media stream to the user device (120).

Further, in some examples, the controller (113) can determine suitable video conference parameters, such as audio, video mixing parameters and the like, and transmit the video conference parameters to the user devices (120) and (130).

In some examples, the controller (113) can cause a display of a user interface on a screen, such as the display screen (114), a screen of the laptop computing device, and the like to facilitate user inputs in the conference room A.

Each of the user devices (120) and (130) can be any suitable video conference enabled equipment, such as a desktop computer, a laptop computer, a tablet computer, a wearable device, an handheld device, a smart phone, a mobile-type device, an embedded-type device, a game console, a gaming device, a personal data assistant (PDA), a telecommunication device, a global positioning system ("GPS") device, a virtual reality ("VR") device, an augmented reality (AR) device, an implanted computing device, an automotive computer, a network-enabled television, an Internet of Things ("IoT") device, a work station, a media player, a personal video recorders (PVR), a set-top box, a camera, an integrated component (e.g., a peripheral device) for inclusion in a computing device, an appliance, or any other sort of computing device.

In the FIG. 1 example, the user device (120) includes wearable multimedia components to allow a user, such as the user B, to participate in a video conference session. For example, the user device (120) includes a head mounted display (HMD) that can be worn on the head of the user B. The HMD can include display optic in front of one or two eyes of the user B to play video. In another example, the user device (120) includes a headset (not shown) that can be worn by the user B. The headset can include microphone to capture user voice and include one or two earpieces for outputting audio sound. The user device (120) also includes suitable communication components (not shown) that can transmit and/or receive media streams.

In the FIG. 1 example, the user device (130) can be a mobile device, such as a smart phone and the like that integrates communication components, imaging components, audio components, and the like together to allow a user, such as the user C, to participate in a video conference session.

In the FIG. 1 example, the sub system (110), the user device (120) and the user device (130) include suitable communication components (not shown) that can interface with a network (101). The communication components may include one or more network interface controllers (NICs) or other types of transceiver circuitry to send and receive communications and/or data over a network, such as the network (101), and the like.

The network (101) may include, for example, public networks such as the Internet, private networks such as an institutional and/or personal intranet, or some combination of private and public networks. The network (108) may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. The network (101) may utilize communications protocols, including packet-based and/or datagram-based protocols such as Internet protocol ("IP"), transmission control protocol ("TCP"), user datagram protocol ("UDP"), or other types of protocols. Moreover, the network (101) may also include a number of devices that facilitate network communications and/or form a hardware basis for the networks, such as switches, routers, gateways, access points, firewalls, base stations, repeaters, backbone devices, and the like. In some examples, the network (101) may further include devices that enable connection to a wireless network, such as a wireless access point ("WAP").

In the FIG. 1 example, the sub system (110) can host a video conference session using peer to peer technologies. For example, after the user device (120) joints the video conference session, the user device (120) can suitably address packets (e.g., using IP address for the sub system (110)) and transmit the packets to the sub system (110), and the sub system (110) can suitably address packets (e.g., using IP address for the user device (120)), and transmits packets to the user device (120). The packets can carry various information and data, such as media streams, acknowledgements, control parameters, and the like.

In some examples, the video conference system (100) can provide video conference sessions of immersive video conferencing. For example, during a video conference session, the sub system (110) is configured to generate immersive media, such as an omnidirectional video/audio using an omnidirectional camera and/or an omnidirectional microphone. In an example, the HMD in the user device (120) can detect head movements of the user B, and determine a viewport orientation of the user B based on the head movements. The user device (120) can send the viewport orientation of the user B to the sub system (110), and the sub system (110) can, in turn, send a viewport dependent stream, such as a video stream that is tailored based on the viewport orientation of the user B (a media stream carrying a video that is tailored based on the viewport orientation of the user B), an audio stream that is tailored based on the viewport orientation of the user B (a media stream carrying a video that is tailored based on the viewport orientation of the user B), and the like to the user device (120) for playing at the user device (120).

In another example, the user C can use the user device (130) to enter a viewport orientation of the user C (e.g., using touch screen of the smart phone). The user device (130) can send the viewport orientation of the user C to the sub system (110), and the sub system (110) can, in turn, send a viewport dependent stream, such as a video stream that is tailored based on the viewport orientation of the user C (a media stream carrying a video that is tailored based on the viewport orientation of the user C), an audio stream that is tailored based on the viewport orientation of the user C (a media stream carrying an audio that is tailored based on the viewport orientation of the user C), and the like to the user device (130) for playing at the user device (130).

It is noted that, during a video conference session, the viewport orientations of the user B and/or user C may vary. The change of the viewport orientations can be informed to the sub system (110), and the sub system (110) can adjust the viewport orientation in respective viewport dependent streams that are respectively sent to the user device (120) and the user device (130).

For ease of description, immersive media is used to refer the wide angle media, such as an omnidirectional video, an omnidirectional audio, and to refer the viewport dependent media that is generated based on the wide angle media. It is noted that, in the present disclosure, 360-degree media, such as 360-degree video, 360-degree audio and the like is used to illustrate techniques for video conference, the techniques of video conference can be used on immersive media of less than 360-degree.

FIG. 2 shows another video conference system (200) according to some examples of the disclosure. The video conference system (200) includes a network based media processing server (240), multiple sub systems, such as sub systems (210A)-(210Z) that are respectively installed at conference room A to conference room Z, and a plurality of user devices, such as user devices (220) and (230). The network based media processing server (240) can setup a video conference session and enable the sub systems (210A)-(210Z) and user devices, such as the user devices (220) and (230) to join the video conference session, thus users, such as users in the conference rooms A-Z, user B of the user device (220) and user C of the user device (230) can participate in the video conference session.

In some examples, the sub systems (210A)-(210Z) and the user devices (220) and (230) are referred to as terminals in the video conference session and network based media processing server (240) can bridge the terminals in the video conference session. In some examples, the network based media processing server (240) is referred to as media aware networking element. The network based media processing server (240) can perform media resource functions (MRF) and can perform media control functions as a media control unit (MCU). In some examples, a terminal in the video conference system (200) that transmits immersive media to the network based media processing server (240) in a video conference session is referred to as immersive teleconferencing and telepresence for remote terminals (ITT4RT) transmitter (Tx) client, or remote transmitter or transmitter client; and a terminal in the video conference system (200) that receives media stream related to an immersive media (e.g., media stream is generated based on the immersive media) from the network based media processing server (240) in a video conference session is referred to as immersive teleconferencing and telepresence for remote terminals (ITT4RT) receiver (Rx) client, or remote receiver, or receiver client. It is noted that a terminal may be ITT4RT Rx client and/or ITT4RT Tx client in a video conference session.

In some embodiments, each of the sub systems (210A)-(210Z) operates similarly to the sub system (110) described above. Further, each of the sub system (210A)-(210Z) utilizes certain components that are identical or equivalent to those used in the sub system (110); the description of these components has been provided above and will be omitted here for clarity purposes. It is noted that the sub systems (210A)-(210Z) can be configured differently from each other.

The user devices (220) and (230) are similarly configured as the user devices (120) and (130) described above and the network (201) is similarly configured as the network (101). The description of these components has been provided above and will be omitted here for clarity purposes.

In some examples, the network based media processing server (240) can initiate a video conference session. For example, one of the sub systems (210A)-(210Z) and the user devices (220) and (230) can access the network based media processing server (240) to initiate a video conference session. The sub systems (210A)-(210Z) and the user devices (220) and (230) can join the video conference session. Further, the network based media processing server (240) is configured to provide media related functions for bridging terminals in the video conference session. For example, the sub systems (210A)-(210Z) can respectively address packets that carry respective media information, such as video and audio, and transmit the packets to the network based media processing server (240). It is noted that, in some examples, the media information sent to the network based media processing server (240) is viewport independent. For example, the sub systems (210A)-(210Z) can send respective videos, such as the entire 360-degree videos, to the network based media processing server (240). Further, the network based media processing server (240) can receive viewport orientation from the user devices (220) and (230), perform media processing to tailor the media, and send the tailored media information to the respective user devices.

In an example, after the user device (220) joints the video conference session, the user device (220) can address packets and transmit the packets to the network based media processing server (240), and the network based media processing server (240) can address packets and transmit the packets to the user device (220). The packets can include any suitable information/data, such as media stream, control parameters and the like. In an example, the user B can use the user device (220) to select a conference room in order to view the video from a sub system in the conference room. For example, the user B can use the user device (220) to select the conference room A in order to view the captured video from the sub system (210A) that is installed in the conference room A. Further, the HMD in the user device (220) can detect head movements of the user B, and determine a viewport orientation of the user B based on the head movements. The user device (220) can send the selection of the conference room A and the viewport orientation of the user B to the network based media processing server (240), and the network based media processing server (240) can process the media sent from the sub system (210A) and send a viewport dependent stream, such as a video stream that is tailored based on the viewport orientation of the user B, an audio stream that is tailored based on the viewport orientation of the user B, and the like to the user device (220) for playing at the user device (220). In some examples, when the user device (220) selects the conference room A, the user device (220), the sub system (210A) and the network based media processing server (240) can communicate with each other based on session description protocol (SDP).

In another example, after the user device (230) joints the video conference session, the user device (230) can address packets and transmit the packets to the network based media processing server (240), and the network based media processing server (240) can address packets and transmit the packets to the user device (230). The packets can include any suitable information/data, such as media stream, control parameters and the like. In some examples, the network based media processing server (240) can send tailored media information to the user device (230). For example, the user C can use the user device (230) to enter a selection of a conference room, such as conference room Z, and a viewport orientation of the user C (e.g., using touch screen of the smart phone). The user device (230) can send the selection information of the conference room Z and the viewport orientation of the user C to the network based media processing server (240), and the network based media processing server (240) can process the media sent from the sub system (210Z) and send a viewport dependent stream, such as a video stream that is tailored based on the viewport orientation of the user C, an audio stream that is tailored based on the viewport orientation of the user C, and the like to the user device (230) for playing at the user device (230). In some examples, when the user device (230) selects the conference room Z, the user device (230), the sub system (210Z) and the network based media processing server (240) can communicate with each other based on session description protocol (SDP).

It is noted that, during a video conference session, the viewport orientations of a user (e.g., the user B, user C) may vary. For example, the change of the viewport orientation of the user B can be informed to the network based media processing server (240) by the user B, and the network based media processing server (240) can adjust the viewport orientation in the viewport dependent stream that is sent to the user device (220) accordingly.

For ease of description, immersive media is used to refer the wide angle media, such as an omnidirectional video, an omnidirectional audio, and to refer the viewport dependent media that is generated based on the wide angle media. It is noted that, in the present disclosure, 360-degree media, such as 360-degree video, 360-degree audio and the like is used to illustrate techniques for video conference, the techniques of video conference can be used on immersive media of less than 360 degrees.

It is noted that conference room selection can be changed during a video conference session. In an example, a user device, such as the user device (220), the user device (230) and the like can trigger a switching from one conference room to another conference room based on an active speaker. For example, in response to the active speaker being in the conference room A, the user device (230) can determine to switch the selection of the conference room to the conference room A, and send the selection of the conference room A to the network based media processing server (240). Then, the network based media processing server (240) can process the media sent from the sub system (210A) and send a viewport dependent stream, such as a video stream that is tailored based on the viewport orientation of the user C, an audio stream that is tailored based on the viewport orientation of the user C, and the like to the user device (230) for playing at the user device (230).

In some examples, the network based media processing server (240) can pause receiving a video stream from any conference room which does not have any active users. For example, the network based media processing server (240) determines that the conference room Z is without any active user, then the network based media processing server (240) can pause receiving the video stream the sub system (210Z).

In some examples, the network based media processing server (240) can include distributed computing resources and can communicate with the sub systems (210A)-(210Z) and the user devices (220) and (230), via the network (201). In some examples, the network based media processing server (240) may be an independent system that is tasked with managing aspects of one or more video conference sessions.

In various examples, the network based media processing server (240) may include one or more computing devices that operate in a cluster or other grouped configuration to share resources, balance load, increase performance, provide fail-over support or redundancy, or for other purposes. For instance, the network based media processing server (240) may belong to a variety of classes of devices such as traditional server-type devices, desktop computer-type devices, and/or mobile-type devices. Thus, although illustrated as a single type of device—a server-type device—the network based media processing server (240) may include a diverse variety of device types and are not limited to a particular type of device. The network based media processing server (240) may represent, but are not limited to, server computers, desktop computers, web-server computers, personal computers, mobile computers, laptop computers, tablet computers, or any other sort of computing device.

According to an aspect of the disclosure, the network based media processing server (240) can perform certain media functions in order to alleviate processing burdens at the terminals, such as the user device (220), the user device (230) and the like. For example, the user device (220) and/or the user device (230) may have limited media processing capacity or may have difficulty in encoding and rendering multiple video streams, the network based media processing server (240) can perform the media processing, such as decoding/encoding audio and video streams and the like, to offload the media processing in the user devices (220) and (230). In some examples, the user devices (220) and (230) are battery powered devices, and when the media processing has been offloaded from the user devices (220) and (230) to the network based media processing server (240), the battery life of the user devices (220) and (230) can be increased.

Media streams from different sources can be processed and mixed. In some examples, such as in international organization for standardization (ISO) 23090-2, overlay can be defined as a second media rendered over a first media. According to an aspect of the disclosure, for a video conference session of immersive video conferencing, additional media content (e.g., video and/or audio, still images, presentation slides and the like) can be overlaid on the immersive media content. The additional media (or media content) can be referred to as overlay media (or overlay media content or overlay in short) to the immersive media (or immersive media content). For example, overlay content can be a piece of visual/audio media rendered over omnidirectional video.

Referring to FIG. 2, in some examples, multiple or all sub systems (210A)-(210Z) can respectively send immersive media and overlay contents to the network based media processing server (240). Thus, there maybe multiple immersive media and related overlay contents from different sources available at the network based media processing server (240). In some embodiments, the network based media processing server (240) can inform the availability of the multiple immersive media and the related overlay contents to terminals that receive media content in a video conference session, for example, using session description protocol (SDP) messages. For example, the network based media processing server (240) can use SDP offer message to inform availability of media contents.

In some examples, SDP is used to provide a standard representation for providing session description metadata to participants of a multimedia session, such as a video conference session. An SDP message includes a session description of a session level for the multimedia session and may include a number of media descriptions at a media level for media in the multimedia session. Each media description can start with an "m=" field and is terminated by either the next "m=" field or by the end of the session description. The "m=" field can include several sub-fields, such as:
 m=<media><port> . . .
where <media> is a sub-field for media type, such as "audio", "video", "text" and the like, <port> is a sub-field for the transport port to which the media stream is sent.

Further, the multimedia session and/or the media can have attributes defined using attribute fields. In some examples, an attribute field can have following two forms:
 a=<attribute>
 a=<attribute>:<value>
The first form can be used when the attribute is a flag with a binary value, and the second form can be used to assign non binary value to the attribute.

In some examples, the network based media processing server (240) receives multiple immerse media (e.g., multiple 360 videos) each from different sources, and can generate SDP message to inform the availability of the multiple immersive media to participants, such as receiver clients. In some examples, one of the sources, for example, a conference room is a default conference room, and other conference rooms can be alternative conference rooms. In an example, the SDP message can include multiple "m=" fields respectively for the multiple immersive media, and include attribute fields for the multiple immersive media.

In an example, the SDP message can include following "m=" field and attribute field for a 360 video from a default conference room:
 m=video
 a=3gpp_360video
 a=content:main In another example, the SDP message can include following "m=" field and attribute field for a 360 video from an alternative conference room:
 m=video
 a=3gpp_360video
 a=content: alt In another example, the SDP message can include following "m=" field and attribute field for a 360 video from other remote participants (e.g., user devices) without the 'content' attribute.
 m=video
 a=3gpp_360video According to an aspect of the disclosure, overlays can be included in SDP message using group attribute. In some embodiments, an attribute that is referred to as itt4rt_group attribute is used in SDP to provide overlay information to immersive media. The itt4rt_group attribute includes a group of media for example in a form of a list of media identifiers (mids) corresponding to the media. For example, the list of mids in the itt4rt_group attribute can include at least one mid associated with an immersive media (e.g., 360-degree media) and at least one mid associated with an overlay as defined by the mid attribute in the corresponding media description.

According to an aspect of the disclosure, when the network based media processing server (240) receives multiple immerse media (e.g., multiple 360 videos) each from different sources, the network based media processing server (240) can generate an SDP message (also referred to as an SDP offer) to inform a remote participant, and the SDP message can include multiple groups defined using the itt4rt_group attribute. In some examples, each group can include one mid associated with an immersive media (e.g., 360-degree media), and one or more other mids associated with 2D media (e.g., 2D video media) as overlays. In an example, the 2D media can be provided from sources other than the source of the immersive media specified inside the group. In another example, the 2D media can be provided from the same source as the immersive media source specified inside the group.

Some aspects of the disclosure provide control techniques for supporting multiple groups of immersive media (e.g., 360 videos) for Immersive Teleconferencing and Telepresence for Remote Terminals (ITT4RT). In some embodiments, the control techniques are used to inform multiple groups that include different immersive media (e.g., different 360-videos) and overlays, for example, from the network based media processing server (240) with MRF/MCU functions to a remote receiver or a ITT4RT-Rx client.

According to an aspect of the disclosure, a grouping control signal can be provided from a source device of an immersive media, such as ITT4RT-Tx client of an immersive media, the sub systems (210A)-(210Z), the user devices (220) and (230), and the like to a network based media processing server, such as the network based media processing server (240), to indicate whether overlays from other sources can be grouped with the immersive media. In some examples, the grouping control signal can be provided as an attribute parameter in an SDP message.

In some examples, an attribute parameter "a=other_overlays" is used in SDP from a transmitter client for grouping of media streams in a single or multiple itt4rt_group at a network based media processing server (e.g., MRF/MCU) that provides media service to the remote receiver clients.

In some examples, an attribute parameter "a=no_other_overlays" is used in SDP from a transmitter client for grouping of media streams in a single or multiple itt4rt_group at a network based media processing server (e.g., MRF/MCU) that provides media service to the remote receiver clients.

In some examples, an attribute a parameter "a=allowed_content" is used in SDP from a transmitter client for grouping of media streams in a single or multiple itt4rt_group at a network based media processing server (e.g., MRF/MCU) that provides media service to the remote receiver clients.

In some embodiments, multiple conference rooms with an omnidirectional camera are in a teleconference, such as shown in FIG. 2, the network based media processing server (240) with functions of MRF/MCU can be the central point for redistribution of the media contents to the ITT4RT-Rx clients. When an ITT4RT-Tx client signals media streams inclusive of the 360-video and overlays, the ITT4RT-Tx client includes a grouping control signal, such as "a=other_overlays", "a=no_other_overlays" "a=allowed_content" in an SDP message to the network based media processing server (240). This grouping control signal indicates whether the network based media processing server (240) is allowed to group the media streams from that ITT4RT-Tx client with media streams from other ITT4RT-Tx clients.

The network based media processing server (240) receives grouping control signals and other suitable media information from the ITT4RT-Tx clients, and forms groups, such as itt4rt_group groups, based on the grouping control signals.

In an embodiment, all ITT4RT-Tx clients allows overlays from other ITT4RT-Tx clients, the network based media processing server (240) may group all media from the ITT4RT-Tx clients into a single itt4rt_group group, and inform the single itt4rt_group group to an ITT4RT-Rx client.

In an embodiment, when one or more ITT4RT-Tx clients do not allow overlays from other ITT4RT-Tx clients, the network based media processing server (240) may form separate itt4rt_group groups respectively for media from the one or more ITT4RT-Tx clients. Further, the network based media processing server (240) may group all media of ITT4RT-Tx clients that allow overlays from other ITT4RT-Tx in a single itt4rt_group group.

In an example, when "a=other_overlays" is in an SDP from a ITT4RT-Tx client, overlays from other ITT4RT-Tx clients are allowed; when "a=other_overlays" is not in the SDP from the ITT4RT-Tx client, overlays from other ITT4RT-Tx are not allowed. In another example, when "a=no_other_overlays" is in an SDP from a ITT4RT-Tx client, overlays from other ITT4RT-Tx clients are not allowed (or disallowed); when "a=no_other_overlays" is not in the SDP from the ITT4RT-Tx client, overlays from other ITT4RT-Tx are allowed.

In some examples, for ITT4RT-Tx clients who send 2D videos (e.g., not immersive video), overlays to the 2D videos are allowed, and no need to send grouping control signals. In some examples, the grouping control signal is signaled when an ITT4RT-Tx client is sending immersive video (e.g., 360-video).

Figure 3:
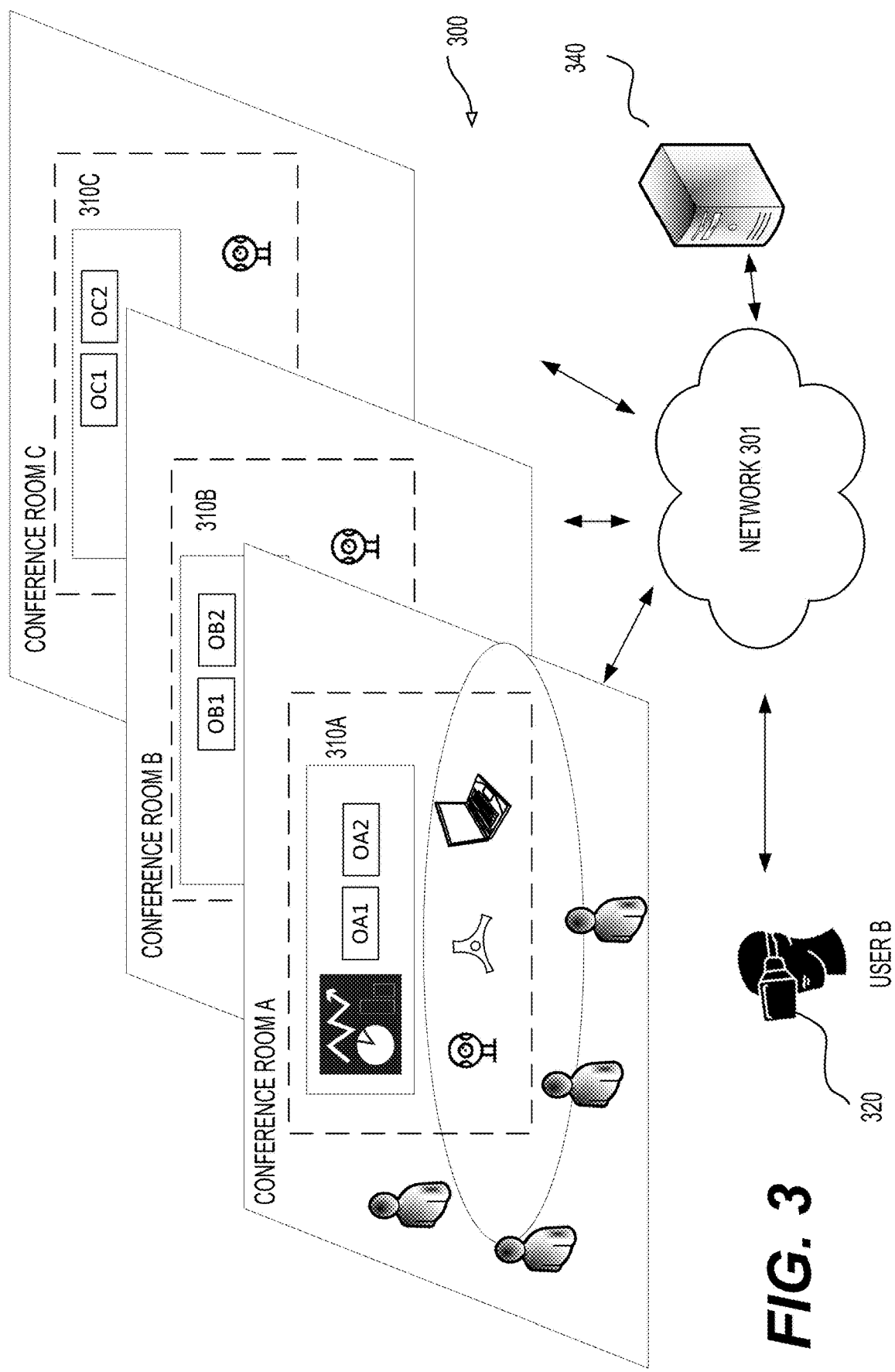
FIG. 3 shows another video conference system according to some examples of the disclosure.

FIG. 3 shows a video conference system (300) to illustrate some specific examples according to some aspects of the disclosure. The video conference system (300) includes a network based media processing server (340)), sub systems (310A)-(310C) that are respectively installed at conference room A to conference room C, and a user device (320). The network based media processing server (340) operates similarly to the network based media processing server (240), and utilizes certain components that are identical or equivalent to those used in the network based media processing server (240). The user device (320) operates similarly to the user device (220).

In the FIG. 3 example, the sub systems (310A) includes an omnidirectional camera that generates a 360 video referred to as 360A (media identifier is mid-360A). The sub system (310A) also generates overlays that are referred to as OA1 (media identifier is mid-OA1) and OA2 (media identifier is mid-OA2). The sub systems (310B) includes an omnidirectional camera that generates a 360 video referred to as 360B (media identifier is mid-360B). The sub system (310B) also generates overlays that are referred to as OB1 (media identifier is mid-OB1) and OB2 (media identifier is mid-OB2). The sub systems (310C) includes an omnidirectional camera that generates a 360 video referred to as 360C (media identifier is mid-360C). The sub system (310C) also generates overlays that are referred to as OC1 (media identifier is mid-OC1) and OC2 (media identifier is mid-OC2).

In some examples, the sub system (310A) sends the 360 video 360A and the overlays OA1 and OA2 to the network based media processing server (340); the sub system (310B) sends the 360 video 360B and the overlays OB1 and OB2 to the network based media processing server (340); the sub system (310C) sends the 360 video 360C and the overlays OC1 and OC2 to the network based media processing server (340). The sub systems (310A), (310B) and (310C) also provide grouping control signals to the network based media processing server (340). The grouping control signal from the sub system (310A) indicates whether overlays from the sub system (310B) and the sub system (310C) can be grouped with the 360 video 360A. The grouping control signal from the sub system (310B) indicates whether overlays from the sub system (310A) and the sub system (310C) can be grouped with the 360 video 360B. The grouping control signal from the sub system (310C) indicates whether overlays from the sub system (310A) and the sub system (310B) can be grouped with the 360 video 360C.

In some examples, the grouping control signal from the sub system (310A) indicates an allowance of grouping of overlays from other sources, such as the sub system (310B) and the sub system (310C), with the 360 video 360A; the grouping control signal from the sub system (310B) indicates an allowance of grouping of overlays from other source, such as the sub system (310A) and the sub system (310C), with the 360 video 360B; the grouping control signal from the sub system (310C) indicates an allowance of grouping of overlays from other sources, such as the sub system (310A) and the sub system (310B), with the 360 video 360C, then the network based media processing server (340) can mix 360 videos and overlays from different sub systems.

In an example, the network based media processing server (340) can form a single itt4rt_group, and include an attribute field in an SDP message (also referred to as SDP offer) to an ITT4RT-Rx client (e.g., user device (320)). For example, the attribute field is shown as following:
a=itt4rt_group:<mid-360A><mid-OA1><mid-OA2>;<mid-360B><mid-OB1><mid-OB2>;<mid-360C><mid-OC1><mid-OC2>

In an example, the network based media processing server (340) can form one or more itt4rt_group groups that mix 360 videos and overlays from different sub systems. In an example, the network based media processing server (340) includes attribute fields corresponding to the one or more itt4rt_group groups in an SDP message (also referred to as SDP offer) to an ITT4RT-Rx client (e.g., user device (320)).

FIGS. 4A-4E show some examples of attribute field(s) corresponding to the one or more itt4rt_group groups.

In some examples, one or more sub systems do not allow grouping of overlays from other sources. For example, a presenter in a conference room with a sub system does not want overlays from other sources to disturb his/her presentation, and thus can configure the sub system to disallow overlays from other sources.

In some examples, the grouping control signal from the sub system (310A) indicates a disallowance of grouping of overlays from other sources, such as the sub system (310B) and the sub system (310C), with the 360 video 360A; the grouping control signal from the sub system (310B) indicates an allowance of grouping of overlays from other source, such as the sub system (310A) and the sub system (310C), with the 360 video 360B; the grouping control signal from the sub system (310C) indicates an allowance of grouping of overlays from other sources, such as the sub system (310A) and the sub system (310B), with the 360 video 360C, then the network based media processing server (340) can mix 360 videos and overlays from different sub systems.

In an example, the network based media processing server (340) can form a separate itt4rt_group group to include the 360 video and overlays from the sub system (310A), and another itt4rt_group group to include other 360 videos and overlays that can be mixed. For example, the network based media processing server (340) includes attribute fields corresponding to the itt4rt_group groups in an SDP message (also referred to as SDP offer) to an ITT4RT-Rx client (e.g., user device (320)). For example, the attribute fields are shown as following:
a=itt4rt_group:<mid-360A><mid-OA1><mid-OA2>
a=itt4rt_group:<mid-360B><mid-OB1><mid-OB2>; <mid-360C><mid-OC1><mid-OC2>

In another example, the network based media processing server (340) can form a separate itt4rt_group group to include the 360 video and overlays from the sub system (310A), and one or more itt4rt_group groups to include other 360 videos and overlays that can be mixed. For example, the network based media processing server (340) includes attribute fields corresponding to the itt4rt_group groups in an SDP message (also referred to as SDP offer) to an ITT4RT-Rx client (e.g., user device (320)).

FIGS. 5A-5D show some examples of attribute field(s) corresponding to the one or more itt4rt_group groups.

According to an aspect of the disclosure, when an ITT4RT-Rx client, such as the user device (320) receives the SDP offer, the user device (320) can send an SDP message (also referred to as SDP answer) to the network based media processing server (340), the SDP answer indicates one itt4rt_group group selected from the itt4rt_group groups in the SDP offer.

According to an aspect of the disclosure, the grouping control signal can be content based. In some embodiments, an attribute field "a=allowed_content" can be included in an SDP message from an ITT4RT-Tx client (e.g., one of the sub systems (310A) (310B) and (310C) in FIG. 3) to a network based media processing server (e.g., the network based media processing server (340)). The attribute field is assigned with a value that indicates the content that is allowed to be mixed. In an example, the value indicates 2D video. In another example, the value indicates image. In another example, the value indicates slides.

For example, the sub system (310A) sends the 360 video 360A and the overlays OA1 (2D video) and OA2 (image) to the network based media processing server (340); the sub system (310B) sends the 360 video 360B and the overlays OB1 (2D video) and OB2 (slides) to the network based media processing server (340); the sub system (310C) sends the 360 video 360C and the overlays OC1 (image) and OC2 (slides) to the network based media processing server (340). The sub systems (310A), (310B) and (310C) also provide grouping control signals to the network based media processing server (340). The grouping control signals from the sub system (310A) indicates whether overlays from the sub system (310B) and the sub system (310C) can be grouped with the 360 video 360A, and overlay content that may be allowed for grouping. The grouping control signal from the sub system (310B) indicates whether overlays from the sub system (310A) and the sub system (310C) can be grouped with the 360 video 360B, and overlay content that may be allowed for grouping. The grouping control signal from the sub system (310C) indicates whether overlays from the sub system (310A) and the sub system (310B) can be grouped with the 360 video 360C, and overlay content that may be allowed for grouping.

In some examples, the grouping control signals from the sub system (310A) indicate an allowance of grouping of overlays from other sources, such as the sub system (310B) and the sub system (310C), with the 360 video 360A, and the allowed overlay content is video, for example using the following attribute fields in an SDP message from the sub system (310A) to the network based media processing server (340):
a=other overlay
a=allowed_content:video The grouping control signals from the sub system (310B) indicate an allowance of grouping of overlays from other source, such as the sub system (310A) and the sub system (310C), with the 360 video 360B, and the allowed overlay content is image, for example using the following attribute fields in an SDP message from the sub system (310B) to the network based media processing server (340):
a=other overlay
a=allowed_content:image The grouping control signals from the sub system (310C) indicate an allowance of grouping of overlays from other sources, such as the sub system (310A) and the sub system (310B), with the 360 video 360C, and the allowed overlay content is slides, for example using the following attribute fields in an SDP message from the sub system (310C) to the network based media processing server (340):
a=other overlay
a=allowed_content: slides Then, the network based media processing server (340) can mix 360 videos and overlays from different sub systems according to the allowed overlay content to form one or more itt4rt_group groups. For example, the network based media processing server (340) includes attribute fields corresponding to the one or more itt4rt_group groups in an SDP message (also referred to as SDP offer) to an ITT4RT-Rx client (e.g., user device (320)).

FIGS. 6A-6E show some examples of attribute field(s) corresponding to the one or more itt4rt_group groups.

According to an aspect of the disclosure, when an ITT4RT-Rx client, such as the user device (320) receives the SDP offer, the user device (320) can send an SDP message (also referred to as an SDP answer) to the network based media processing server (340), the SDP answer indicates one itt4rt_group group selected from the one or more itt4rt_group groups in the SDP offer.

Figure 7:
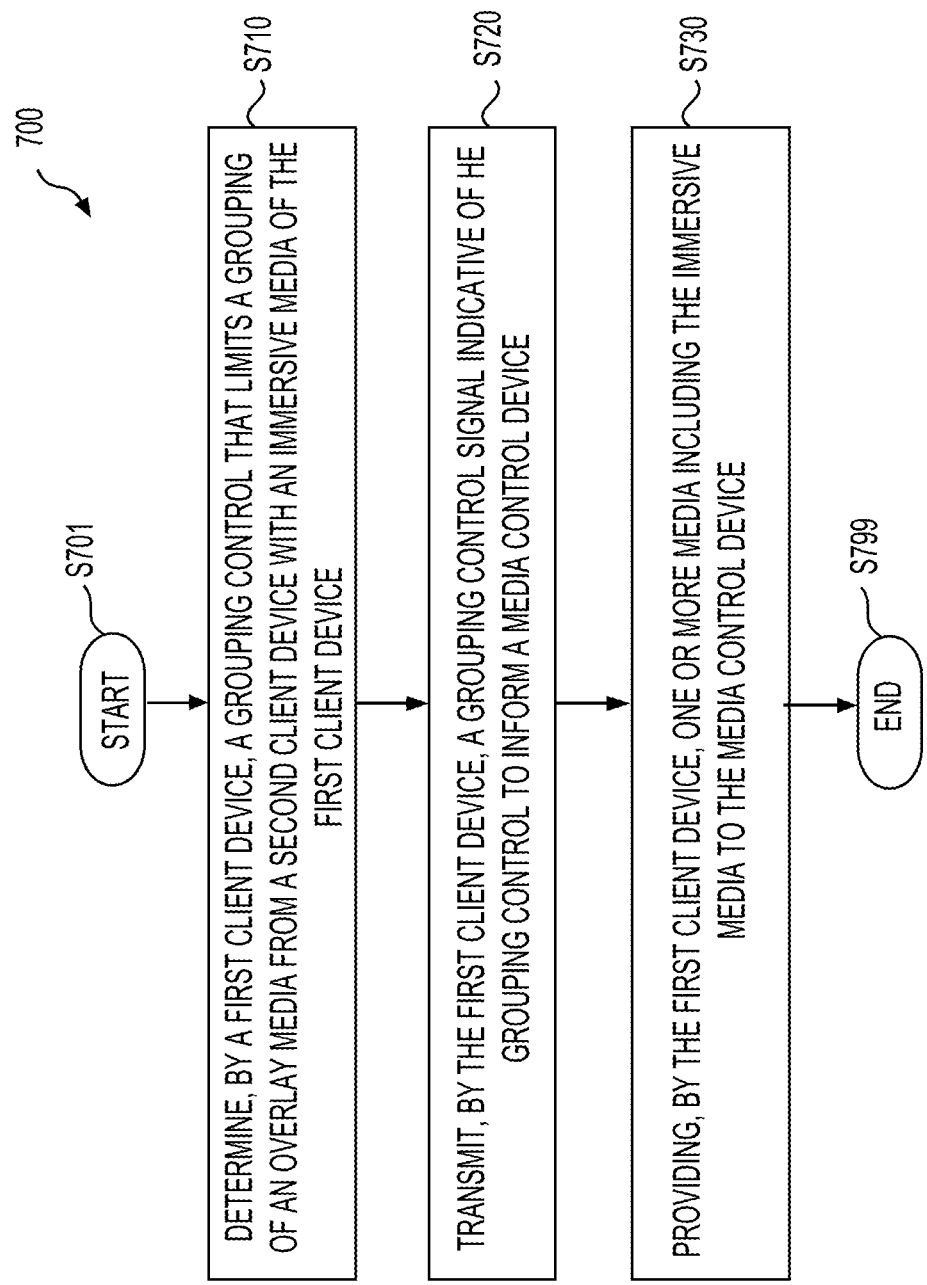
FIG. 7 shows a flow chart outlining a process according to some examples of the disclosure.

FIG. 7 shows a flow chart outlining a process (700) according to an embodiment of the disclosure. In some embodiments, the process (700) can be executed by processing circuitry in a first client device that provides immersive media content in a video conference, such as the processing circuitry in the sub systems (110), (210A)-(210Z), (310A)-(310C), and the like. In some embodiments, the process (700) is implemented in software instructions, thus when the processing circuitry executes the software instructions, the processing circuitry performs the process (700). The process starts at (S701) and proceeds to (S710).

At (S710), the first client device determines a grouping control that limits a grouping of an overlay media from a second client device with the immersive media of the first client device. In an example, the first client device determines the grouping control based on a user input. In another example, the first client device determines the grouping control based on a configuration at the first client device.

The immersive media can be any suitable immersive media, such as an omnidirectional video, a 360 degree video, and a wide angle video and the like.

At (S720), the first client device transmits a grouping control signal indicative of the grouping control to inform a media control device.

In some examples, the first client device transmits a session description protocol (SDP) message with an attribute field indicative of the grouping control.

In an example, the first client device transmits the SDP message with the attribute field indicative of a disallowance of a grouping of the overlay media from the second client device with the immersive media of the first client device. For example, the attribute field is in a form of "a=no_other_overlays".

In another example, the first client device transmits the SDP message with the attribute field indicative of an allowance of a grouping of the overlay media from the second client device with the immersive media of the first client device. For example, the attribute field is in a form of "a=other_overlays".

In another example, the first client device transmits the SDP message with the attribute field indicative of a media type that is allowed to be grouped with the immersive media of the first client device. For example, the attribute field is in a form of "a=allowed_content". The media type can be 2D video, image, or slides.

In some examples, the first client device can transmit the SDP message with a first attribute field indicative of an allowance of a grouping of the overlay media from the second client device with the immersive media of the first client device, and a second attribute field indicative of an allowed media type.

At (S730), the first client device provides one or more media including the immersive media to the media control device. The one or more media can also include overlay media from the first client device.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
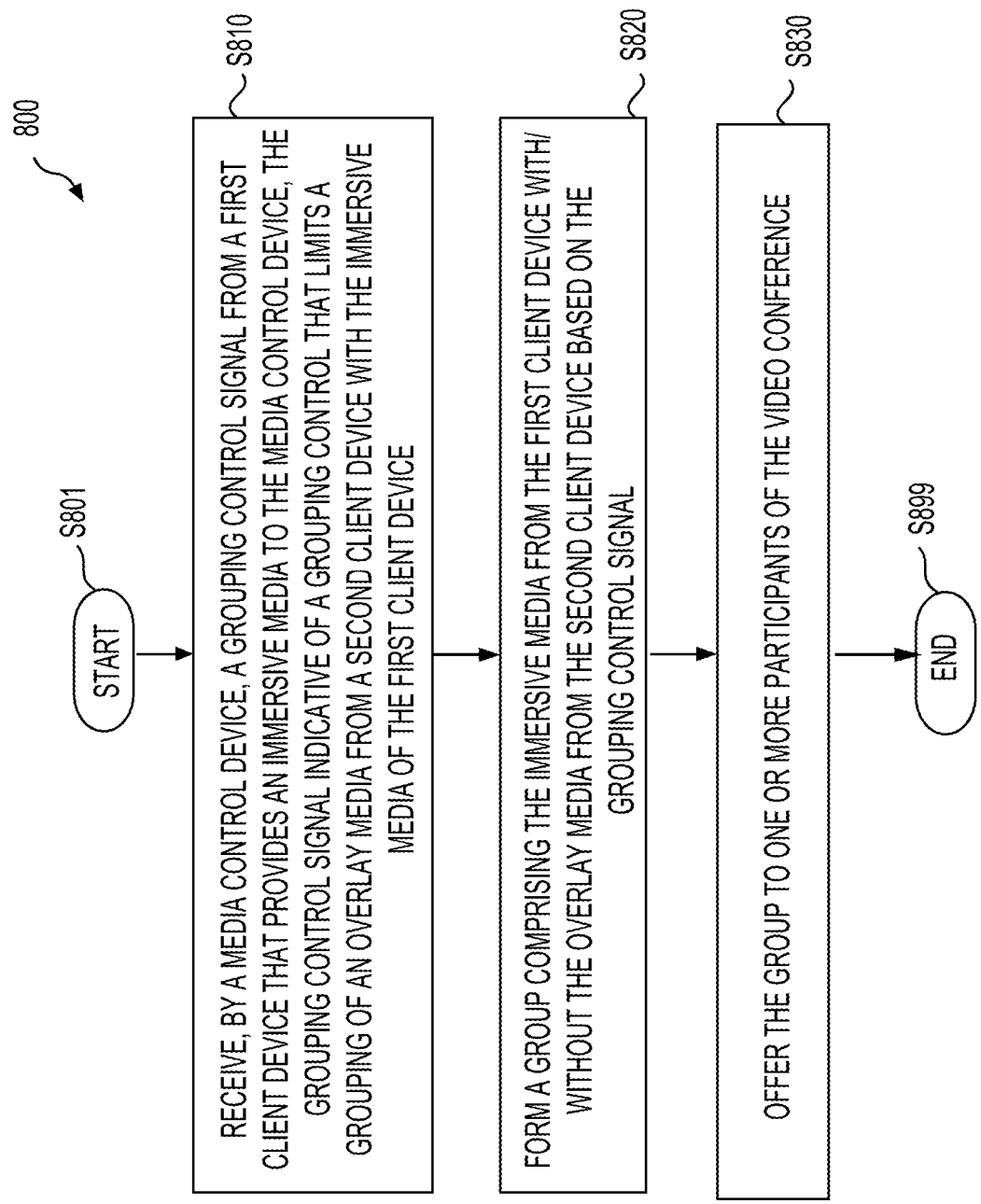
FIG. 8 shows a flow chart outlining a process according to some examples of the disclosure.

FIG. 8 shows a flow chart outlining a process (800) according to an embodiment of the disclosure. In various embodiments, the process (800) can be executed by processing circuitry in a media control device of network based media processing for a video conference, such as the network based media processing server (240), the network based media processing server (340) and the like. In some embodiments, the process (800) is implemented in software instructions, thus when the processing circuitry executes the software instructions, the processing circuitry performs the process (800). The process starts at (S801) and proceeds to (S810).

At (S810), the media control device receives a grouping control signal from a first client device that provides an immersive media to the media control device, the grouping control signal is indicative of a grouping control that limits a grouping of an overlay media from a second client device with the immersive media of the first client device.

The immersive media can be any suitable immersive media, such as an omnidirectional video, a 360 degree video, and a wide angle video and the like.

In some examples, the media control device receives a session description protocol (SDP) message with an attribute field indicative of the grouping control.

In an example, the media control device receives the SDP message with the attribute field indicative of a disallowance of a grouping of the overlay media from the second client device with the immersive media of the first client device. For example, the attribute field is in a form of "a=no_other_overlays".

In another example, the media control device receives the SDP message with the attribute field indicative of an allowance of a grouping of the overlay media from the second client device with the immersive media of the first client device. For example, the attribute field is in a form of "a=other_overlays".

In another example, the media control device receives the SDP message with the attribute field indicative of a media type that is allowed to be grouped with the immersive media of the first client device. For example, the attribute field is in a form of "a=allowed_content". The media type can be 2D video, image, or slides.

In some examples, the media control device receives the SDP message with a first attribute field indicative of an allowance of a grouping of the overlay media from the second client device with the immersive media of the first client device, and a second attribute field indicative of an allowed media type.

At (S820), the media control device determines a group including the immersive media from the first client device with/without the overlay media from the second client device based on the grouping control signal.

In an example, when the grouping control signal indicates a disallowance of a grouping of the overlay media from the second client device with the immersive media of the first client device, the media control device forms a group that includes the immersive media from the first client device, and the group may include overlays from the first client device, but the group does not include overlays from other client device.

In an example, when the grouping control signal indicates an allowance of a grouping of the overlay media from the second client device with the immersive media of the first client device, the media control device can form a group that includes the immersive media from the first client device, and the overlay media from the second client device.

In an example, the grouping control signal indicates an allowed media type to be grouped with the immersive media. Then, when the overlay media from the second client device is of the allowed media type, the media control device can form a group including of the immersive media of the first client device and the overlay media from the second client device. When the overlay media from the second client device is not of the allowed media type, the overlay media from the second client device cannot be grouped with the immersive media from the first client device.

At (S830), the media control device offers the group to one or more participants of the video conference. In an example, the media control device can send a SDP offer with attribute fields that define one or more groups, such as the itt4rt_group groups, and the like, to one or more participants (e.g., user device (320), user device (220), user device (230), some of the sub systems (210A)-(210Z), some of the sub systems (310A)-(310C), and the like).

Then, the process proceeds to (S899) and terminates.

The process (800) can be suitably adapted. Step(s) in the process (800) can be modified and/or omitted. Additional step(s) can be added. Any suitable order of implementation can be used.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
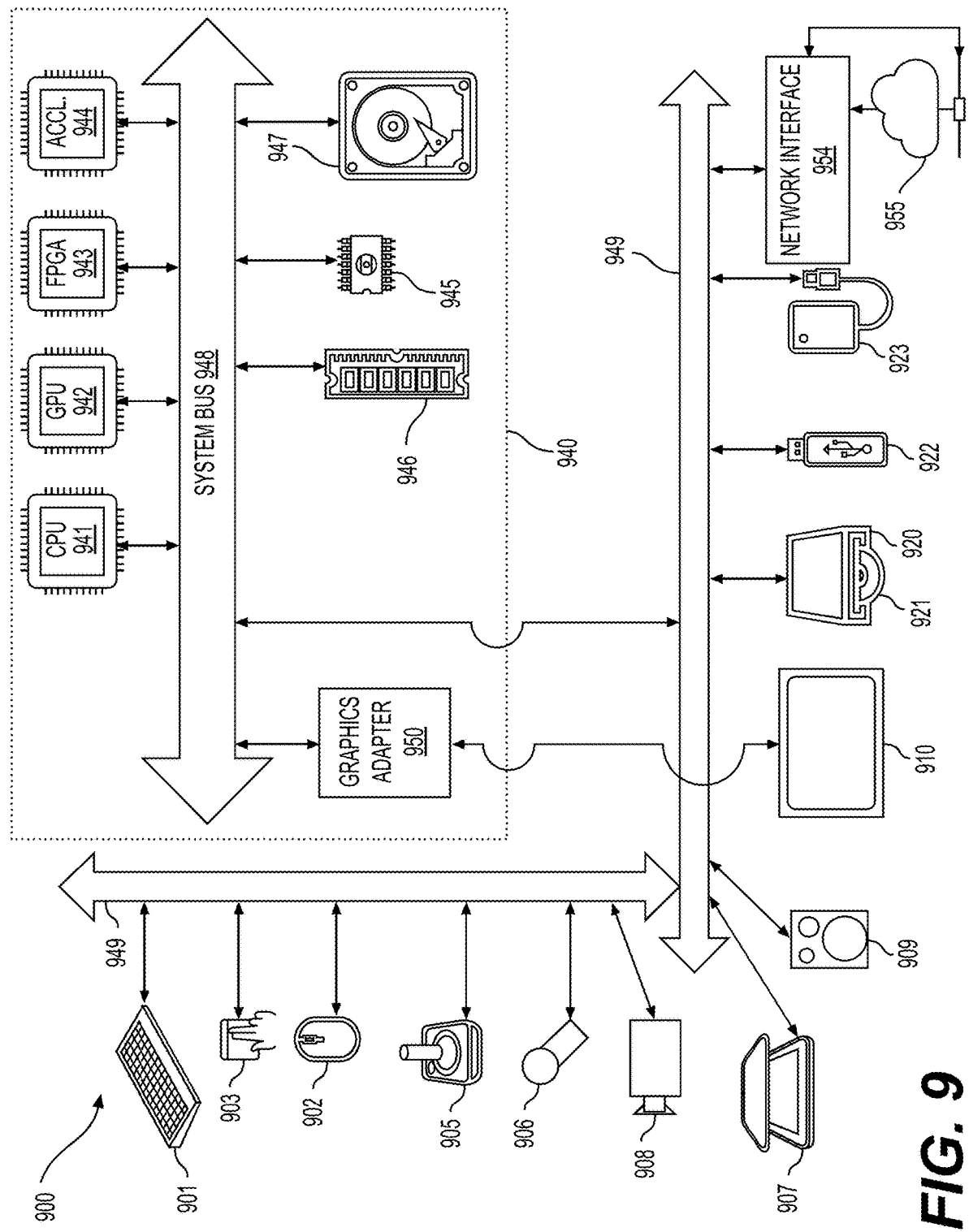
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for a video conference, comprising:
   determining, by a first client device of the video conference, a grouping control that limits a grouping of an overlay media from a second client device participating in the video conference with an immersive media of the first client device;
   transmitting, by the first client device, a grouping control signal indicative of the grouping control to inform a media control device whether other overlays are allowed, the grouping of the overlay media the second client device with the immersive media of the first client device being disallowed responsive to the grouping control signal indicating that the other overlays are not allowed;
   providing, by the first client device, a plurality of media streams including the immersive media to the media control device, wherein the media control device groups the plurality of media streams in one or more groups based on the grouping control signal received from the first client device; and
   receiving, by the first client device, a media group generated by the media control device, the media group including the immersive media received from the first client device and the overlay media from the second client device when the transmitted grouping control signal indicates that other overlays are allowed.

2. The method of claim 1, wherein the immersive media comprises at least one of an omnidirectional video, a 360 degree video, and a wide angle video.

3. The method of claim 1, wherein the transmitting the grouping control signal indicative of the grouping control to inform the media control device further comprises: transmitting a session description protocol (SDP) message with an attribute field indicative of the grouping control.

4. The method of claim 3, wherein the transmitting the SDP message with the attribute field indicative of the grouping control further comprises:
   transmitting the SDP message with the attribute field indicative of the disallowance of the grouping of the overlay media from the second client device with the immersive media of the first client device.

5. The method of claim 4, wherein the attribute field is in a form of "a=no_other_overlays".

6. The method of claim 3, wherein the transmitting the SDP message with the attribute field indicative of the grouping control further comprises:
   transmitting the SDP message with the attribute field indicative of an allowance of the grouping of the overlay media from the second client device with the immersive media of the first client device.

7. The method of claim 1, wherein the media control device provides the generated media group to a remote immersive teleconferencing and telepresence for remote terminal (ITT4RT) receiver (Rx) client.

8. The method of claim 3, wherein the transmitting the SDP message with the attribute field indicative of the grouping control further comprises:

transmitting the SDP message with the attribute field indicative of a media type that is allowed to be grouped with the immersive media of the first client device.

9. The method of claim 8, wherein the attribute field is in a form of "a=allowed_content".

10. The method of claim 8, wherein the media type comprises at least one of a two-directional video, an image, and slides.

11. The method of claim 3, wherein the transmitting the SDP message with the attribute field indicative of the grouping control further comprises:

transmitting the SDP message with a first attribute field indicative of an allowance of the grouping of the overlay media from the second client device with the immersive media of the first client device, and a second attribute field indicative of an allowed media type.

12. An apparatus for a video conference, comprising processing circuitry configured to:

determine a grouping control that limits a grouping of an overlay media from another apparatus participating in the video conference with an immersive media of the apparatus;

transmit a grouping control signal indicative of the grouping control to inform a media control device whether other overlays are allowed, the grouping of the overlay media from the other apparatus with the immersive media of the apparatus being disallowed responsive to the grouping control signal indicating that the other overlays are not allowed;

provide a plurality of media streams including the immersive media to the media control device, wherein the media control device groups the plurality of media streams in a single or multiple groups based on the grouping control signal received from the apparatus; and receive a media group generated by the media control device, the media group including the immersive media of the apparatus and the overlay media from the other apparatus when the transmitted grouping control signal indicates that other overlays are allowed.

13. The apparatus of claim 12, wherein the immersive media comprises at least one of an omnidirectional video, a 360 degree video, and a wide angle video.

14. The apparatus of claim 12, wherein the processing circuitry is configured to: transmit a session description protocol (SDP) message with an attribute field indicative of the grouping control.

15. The apparatus of claim 14, wherein the processing circuitry is configured to:

transmit the SDP message with the attribute field indicative of the disallowance of the grouping of the overlay media from the other apparatus with the immersive media of the apparatus.

16. The apparatus of claim 15, wherein the attribute field is in a form of "a=no_other_overlays".

17. The apparatus of claim 14, wherein the processing circuitry is configured to:

transmit the SDP message with the attribute field indicative of an allowance of the grouping of the overlay media from the other apparatus with the immersive media of the apparatus.

18. The apparatus of claim 14, wherein the processing circuitry is configured to: transmit the SDP message with the attribute field indicative of a media type that is allowed to be grouped with the immersive media of the apparatus.

19. The apparatus of claim 18, wherein the media type comprises at least one of a two-directional video, an image, and slides.

20. The apparatus of claim 14, wherein the processing circuitry is configured to:

transmit the SDP message with a first attribute field indicative of an allowance of the grouping of the overlay media from the other apparatus with the immersive media of the apparatus, and a second attribute field indicative of an allowed media type.

* * * * *